(12) United States Patent
Haltiner, Jr. et al.

(10) Patent No.: US 7,754,367 B2
(45) Date of Patent: Jul. 13, 2010

(54) SOLID BONDED INTERCONNECT SYSTEM IN A LIGHTWEIGHT SOLID OXIDE FUEL CELL STACK

(75) Inventors: Karl J. Haltiner, Jr., Fairport, NY (US); Subhasish Mukerjee, Pittsford, NY (US); Lawrence A. Chick, West Richland, WA (US); Kerry D. Meinhardt, Kennewick, WA (US); Vincent L. Sprenkle, Richland, WA (US); Kenneth Scott Weil, Richland, WA (US); Jin Yong Kim, Richland, WA (US)

(73) Assignees: Delphi Technologies, Inc., Troy, MI (US); Battelle Memorial Institute, Richland, WA (US)

( * ) Notice: Subject to any disclaimer, the term of this patent is extended or adjusted under 35 U.S.C. 154(b) by 109 days.

(21) Appl. No.: 11/823,591

(22) Filed: Jun. 28, 2007

(65) Prior Publication Data

US 2009/0004545 A1 Jan. 1, 2009

(51) Int. Cl. *H01M 8/00* (2006.01)
(52) U.S. Cl. .......................... 429/38; 429/34
(58) Field of Classification Search .................. 429/12, 429/13, 34, 35, 36, 37, 38, 39
See application file for complete search history.

(56) References Cited

U.S. PATENT DOCUMENTS

| | | |
|---|---|---|
| 2002/0004155 A1 | 1/2002 | Haltiner, Jr. et al. |
| 2005/0118482 A1 | 6/2005 | Sriramulu et al. |
| 2005/0136312 A1* | 6/2005 | Bourgeois et al. ............ 429/32 |
| 2005/0155490 A1 | 7/2005 | Barker et al. |
| 2007/0003819 A1 | 1/2007 | Zhang |
| 2008/0107948 A1* | 5/2008 | Yamanis ...................... 429/33 |
| 2008/0299417 A1* | 12/2008 | Schuisky et al. ............ 429/12 |

FOREIGN PATENT DOCUMENTS

| | | |
|---|---|---|
| DE | 10027311 | 12/2001 |
| EP | 1732157 | 12/2006 |
| EP | 1786056 | 5/2007 |
| WO | 00/76015 | 12/2000 |

OTHER PUBLICATIONS

EP Search Report dated Oct. 29, 2008.

* cited by examiner

*Primary Examiner*—Patrick Ryan
*Assistant Examiner*—Monique Wills
(74) *Attorney, Agent, or Firm*—Thomas N. Twomey

(57) ABSTRACT

An interconnect system including: a separator plate to provide an anode gas flow space; a first metal interconnect disposed between the separator plate and an anode surface; a nickel oxide paste applied in a pattern over the surface of the anode and adjacent surface of the separator plate which when sintered results in a first conductive layer bonded to the anode and the first interconnect, and a second conductive layer bonded to the first interconnect and the separator plate; a second metal interconnect disposed between a cathode surface of the cell and the separator plate of an adjacent cell cassette; and a silver-containing paste applied over the surface of the cathode and the separator plate which when sintered results in a third conductive layer bonded to the cathode and the second interconnect, and a fourth conductive layer bonded to the second interconnect and the separator plate.

15 Claims, 2 Drawing Sheets

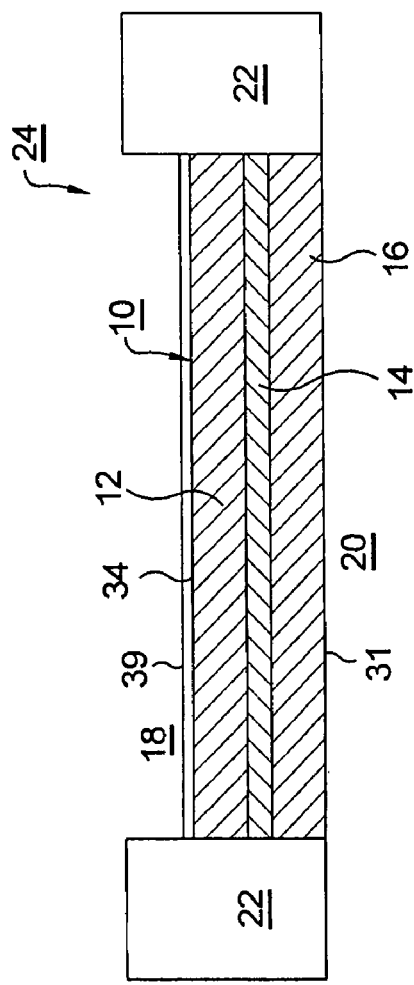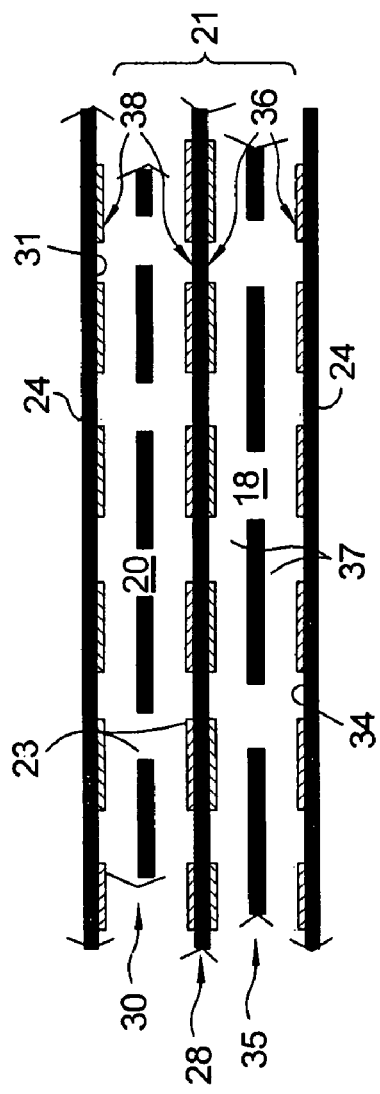
FIG. 1.
FIG. 2.

SOLID BONDED INTERCONNECT SYSTEM IN A LIGHTWEIGHT SOLID OXIDE FUEL CELL STACK

RELATIONSHIP TO GOVERNMENT CONTRACTS

The present invention was supported in part by a US Government Contract, No. DE-FC26-02NT41246. The United States Government may have rights in the present invention.

TECHNICAL FIELD

The present invention relates to solid oxide fuel cell (SOFC) stacks; more particularly, to interconnects for connecting adjacent fuel cells electrically and mechanically; and most particularly, to an improved interconnect system for such purpose that provides an SOFC stack that is mechanically and electrically robust.

BACKGROUND OF THE INVENTION

In practical fuel cell systems, the output of a single fuel cell is typically less than one volt, so connecting multiple cells in series is required to achieve useful operating voltages. Typically, a plurality of fuel cells are mechanically stacked up in a "stack" and are electrically connected in series from the anode of one cell to the cathode of an adjacent cell via intermediate stack elements known in the art as "interconnects".

In an SOFC stack, the interconnect must perform a variety of functions, including:

Low resistance electrical contact at operating temperatures of 500° C. to 1000° C., operating for tens of thousands of hours;

Robust connection that endures vibration, shock, and thermal cycling;

Separator plate, in the case of a planar SOFC stack, to prevent intermixing of the anode fuel gas stream for one cell with the cathode air stream of the adjoining cell; current must pass through the separator plate;

Must be porous or have passages that allow access of the anode fuel gas and the cathode air to their respective surfaces of the cell;

In some cases, the interconnect also provides mechanical support to the cell.

Various forms of interconnect systems are known in the prior art:

A rigid mounting late that incorporates the anode gas and cathode air passages and separator plate function. Contact is made to the cell with contact paste comprising NiO which reduces to Ni in operation on the anode side, and conductive ceramic pastes on the cathode side. These types of interconnects typically are heavy, complex to fabricate, and expensive. There is also very little conformance between parts at operating temperatures, which can induce stress into the cells, leading to fracture resulting in loss of function. In addition, since parts are rigid, there is no allowance for relative motion during thermal cycling which will stress the cell and fracture the contact paste bonds, resulting in poor connection.

A very flexible connecting filament system. In this type of system, no mechanical support is provided for the cell by the interconnect. The cell is allowed to float, which theoretically reduces stress in the cell. Adhesive contact is made between the filaments and the cell with NiO and conductive pastes similar to the above. This type of system results in tremendous variation in the shape and size of the anode fuel gas and cathode air stream passages, which leads to large variations in gas flow, and therefore performance, from one cell to the next. Also, since the cell is actually quite flexible at operating temperatures, it will take shapes that are non-planar. It has been shown, by finite element analysis and in practice, that this can actually result in higher cell stress and a propensity to fracture, particularly during thermal cycling.

A connection system comprising springy formed wire or sheet strips. The intent of this type of interconnect scheme is not only to provide some support for the cell, but also to provide some compliance for surface irregularities and relative motion during thermal cycling. Contact pastes similar to those above are used, although adhesion is not required. A problem with this system is that there will always be slight mismatches in spring forces exerted on the cell, and these mismatches will vary across the cell surface, resulting in localized bending forces and therefore stress in the cell which can lead to fracture. In addition, although the interconnect is compliant, there are still shear forces which can fracture the fragile cathode conductive ceramic paste joint which will still make contact, but at increased electrical resistance.

A thin metal separator plate that has dimples or ribs formed into it for contact with the anode and cathode. Contact pastes as above typically are used. This type of structure is very economical but has several drawbacks. Due to sheet metal forming limitations and the necessary restriction in geometry by using one part, the number, shape, and positions of the contact points are severely compromised. Also, if the plate material is ferritic stainless steel, which is a good choice for low cost and thermal expansion matching to the cell, the plate has very little strength at operating temperatures and the formed-in features will creep, resulting in a reduction of contact and loss in positioning of the cell. If a stronger alloy is used, it will have a thermal expansion mismatch, resulting in severe shear forces that can fracture the contact paste joints, leading to an increase in resistance. Also, there will be mismatched contact forces similar to those in the springy contact system.

The cathode in a SOFC cell needs to have good electrical contact with the metallic interconnect mesh or other flow feature in the cathode side of the repeating unit. This contact is achieved typically by using a conductive paste but it needs to be low resistance, have compatibility with the cell component, and be durable at the SOFC operating temperatures.

Typical prior art SOFC interconnects have perovskites or silver paste as the contact paste between the cathode and the metal interconnect. Perovskite pastes have a drawback in that they sinter to a brittle ceramic, leading to cracked contact interfaces which lead to higher resistance over time and thermal cycling. Silver paste is a very good conductor and can form a low resistance contact but it has the drawback in that it is volatile at the operating temperature of SOFC (m.p=961° C.) and can cause potential damage to the stack (shorts etc).

What is needed in the art is an interconnect system that provides a mechanically robust joint between itself and adjacent fuel cells that will endure thermal cycling and has minimal electrical contact resistance.

It is a principal object of the present invention to increase the reliability and durability of an SOFC system.

SUMMARY OF THE INVENTION

Briefly described, an interconnect system for mechanically and electrically connecting adjacent fuel cells in a fuel cell stack comprises five elements: a separator plate to provide an anode gas flow space when joined to a mating cell frame and to provide electrical connection between the anode and the cathode; a first metal interconnect disposed between the separator plate and the anode surface; a nickel oxide paste applied in a pattern over the surface of the anode and adjacent surface of the separator plate which when sintered results in a metal layer bonded to the anode and to the separator plate; a second metal interconnect disposed between the cathode surface of the cell and the separator plate of the adjacent cell cassette; and a silver alloy paste applied over the surface of the cathode and the separator plate which when sintered results in a metal layer bonded to the cathode and to the separator plate.

BRIEF DESCRIPTION OF THE DRAWINGS

The present invention will now be described, by way of example, with reference to the accompanying drawings, in which:

FIG. 1 is a schematic cross-sectional view of a fuel cell, after sintering, mounted in a picture-frame as a picture-frame assembly;

FIG. 2 is a schematic cross-sectional view of an interconnect system in accordance with the invention disposed between adjacent picture-frame assemblies in a fuel cell stack.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 3:
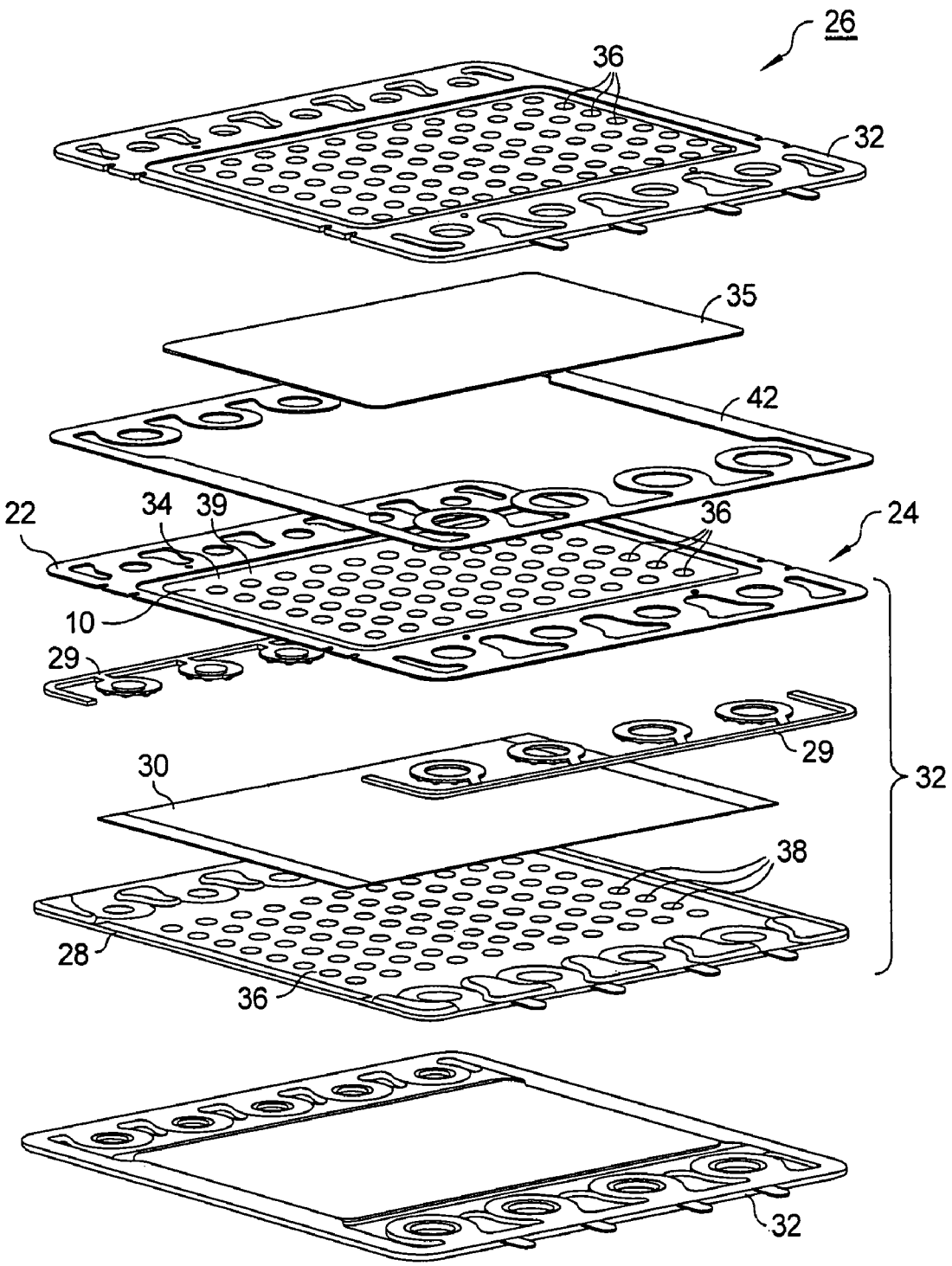
FIG. 3 is a exploded isometric view showing three fuel cell cassettes in accordance with the invention in a fuel cell stack.

Referring to FIGS. 1 through 3, an exemplary SOFC fuel cell 10 comprises a cathode layer 12, an electrolyte layer 14 formed of a solid oxide and bonded to the cathode layer 12, and an anode layer 16 bonded to the electrolyte layer 14 on a side opposite from the cathode layer. As is well known in the fuel cell art, air 18 is passed over the surface 34 of the cathode layer 12, and oxygen from the air migrates through the electrolyte layer 14 and reacts in the anode layer 16 with hydrogen 20 being passed over the anode surface layer 31 to form water, thereby creating an electrical potential between the anode and the cathode, typically of about 1 volt. In a presently preferred embodiment, after the sintering process, fuel cell 10 is mounted, for handling, protection, and assembly into a stack, within a metal frame 22 referred to in the art as a "picture frame", to form a "cell-picture frame assembly" 24.

To facilitate formation of a stack 26 of fuel cells wherein the voltage formed is a multiple of the number of fuel cells in the stack, connected in series, a presently-preferred intermediate process joins together a cell-picture frame assembly 24 with a separator plate 28 and a first solid (anode) interconnect 30 to form an intermediate structure known as a fuel cell cassette 32 ("cassette"). The thin sheet metal separator plate 28 is stamped and formed to provide, when joined to the mating cell frame 22 and anode spacers 29, a flow space 23 for the anode gas 20. Preferably, the separator plate 28 is formed of ferritic stainless steel for low cost, and is coated on the side facing the cathode with a thin layer of conductive material that will prevent Cr poisoning of the cathode in the assembled stack. This coating is typically a perovskite such as LSC (lanthanum, strontium, cobalt).

First anode interconnect 30 is placed between the separator plate 28 and the anode surface 31 of the cell within the cassette 32. The anode interconnect 30 can be a woven wire mesh, a sheet metal part with photochemically machined flow passages and contact points, or other parts that are of uniform thickness but solid in the direction perpendicular to the cell surface in a multitude of points. The thickness of this part is slightly less than the as-formed space available within the cassette; this prevents interference due to tolerances when assembling the cassette at room temperature. The separator plate will creep to the proper dimension during the final step of stack assembly. NiO paste 38 is screen printed in a pattern to the separator plate 28 and the anode surface 31 of the cell 24. The resulting Ni particles, when reduced by high temperature during stack assembly, diffusion bond to the separator plate 28, anode interconnect 30, and anode surface 31 of the cell. This bond provides a mechanically robust joint that will endure thermal cycling and has minimal electrical contact resistance.

A thin film of paste containing silver or silver alloy is applied uniformly to the top surface 34 of the cell cathode layer during cell fabrication and is sintered at elevated temperature to the cathode as part of the cell fabrication process. With the correct blend of paste organic materials that contain the silver or silver alloy powder, and the correct sintering temperature profile, thin layer 39 of microscopically porous sintered silver or silver alloy will be tightly adhered to the cathode surface 34. This metallic layer 39 provides excellent electrical contact with the cathode, and enables a metallurgically bonded contact with metallic contact paste in the stack assembly. This layer has been found to add long-term operational stability to the cell, and provides a metallic surface for joining the cathode interconnect 35. This bond provides a conductive and mechanically robust joint that will endure thermal cycling and has minimal contact resistance. This metallic cap layer 39 can also be used as a barrier coating for contaminants that can potentially harm the cathode.

A currently preferred silver paste is an alloy of Ag—X where X is palladium (m.p.=1554° C.) or other conductive metals with higher melting points. An alloy comprising 80-90% Ag and 20-10% Pd is a very effective conductive paste for the cathode to the interconnect. This alloy has all the benefits of high conductivity and good mechanical adhesion to the cathode as well as stability at the SOFC operating temperatures.

The cathode interconnect 35, installed during final assembly against the cathode, provides a cathode air flow space 37. Interconnect 35 also can be a woven wire mesh, a sheet metal part with photochemically machined flow passages and contact points, or other parts that are of uniform thickness but solid in the direction perpendicular to the cell surface in a multitude of points. A woven wire mesh fabricated from an alumina-forming ferritic stainless steel alloy (a FeCrAlloy type of material) is presently preferred. The alumina-forming alloy prevents chromium poisoning of the cathode by outgassing of chrome from the ferritic stainless steel but has very poor surface conductivity in an oxidizing environment, so it is plated with a thin layer of silver. The silver provides the conductive path between the cathode and the next separator plate, and the wire mesh provides the mechanical structure. If desired, other interconnect parts can be formed in a similar fashion as an alumina-forming structure plated with silver. These interconnect parts 30,35 have a good Coefficient of Thermal Expansion (CTE) match to the cells 24, which minimizes in-plane shear forces.

The cathode interconnect 35 is placed between the separator plate 28 and the cathode of the cell of the adjoining cassette. Silver or silver alloy paste 36 is screen printed in a pattern to the separator plate 28 and to the thin metallic coating 39 on cathode surface 34 of the cell 24 of the adjoining cassette. The silver or silver alloy powders in the contact paste, when sintered by high temperature during stack assembly, diffusion bond to the separator plate 28, cathode interconnect 35, and the metallic coating 39 on the cathode surface 34 of the cell. This bond provides a mechanically robust joint that will endure thermal cycling and has minimal electrical contact resistance.

During the final stack assembly process, a glass perimeter seal 42 is inserted between adjacent surfaces of the cassettes 32 and the stack is brought to operating temperature and allowed to settle to its final form. The separator plate and cell frame will deform, providing a compliant assembly, until the cells and interconnects are resting on one another, under load, which prevents further motion. At that point, the interconnects become incompressible forming many individual contact points with the adjacent separator plate and cathode or anode. Preferably, each contact point makes up an area of about $0.01 \text{ mm}^2$ to $5.0 \text{ mm}^2$ and the points are spaced between about 0.5 mm and 5.0 mm apart. The metallic contact pastes on both sides of the cell not only make a metallurgically bonded contact joint, but also fill in the micro irregularities of the cell surface providing good mechanical support to the cell.

As just described, an improved interconnect system in accordance with the invention has the following advantages over prior art interconnect systems:

A mechanically compliant structure prior to and during the final assembly process which will accommodate part-to-part variation. Microscopic variations are accommodated by the pastes.

A mechanically stiff structure after final assembly that provides good support to the cell, preventing it from going out of plane, and uniform spacing for uniform gas flow, resulting in minimal variation in cell-to-cell performance.

Mechanically robust bonds at the interconnect interfaces that have minimal resistance loss, and which will endure thermal cycling. In particular, the cathode contact is metallic and superior to the typical prior art conductive ceramic.

No Cr poisoning of the cathode.

Inexpensive to fabricate and simple to assemble.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. An interconnect system for connecting adjacent fuel cells having anodes and cathodes to form a fuel cell stack, consisting of:
    a) a separator plate disposed between an anode of a first fuel cell and a cathode of a second fuel cell to provide an anode gas flow space and a cathode air flow space and to provide electrical conductivity between said anode and said cathode;
    b) a first metal interconnect disposed between said separator plate and said anode, wherein said first metal interconnect is incompressible in a direction perpendicular to a surface of said cell;
    c) a first conductive layer bonded to said anode and said first metal interconnect, and a second conductive layer bonded to said first metal interconnect and said separator plate;
    d) a second metal interconnect disposed between said separator plate and said cathode, wherein said second metal interconnect is incompressible in a direction perpendicular to a surface of said cell; and
    e) a third conductive layer bonded to said cathode and said second metal interconnect, and a fourth conductive layer bonded to said second metal interconnect said separator plate.

2. An interconnect system in accordance with claim 1 wherein said separator plate is formed of ferritic stainless steel.

3. An interconnect system in accordance with claim 1 wherein at least one of said first conductive layer and said second conductive layer includes nickel.

4. An interconnect system in accordance with claim 1 wherein at least one of said third conductive layer and said fourth conductive layer includes a material selected from the group consisting of silver and silver alloy.

5. An interconnect system in accordance with claim 4 wherein said silver alloy includes palladium.

6. An interconnect system in accordance with claim 1 wherein said first and second fuel cells are solid oxide fuel cells.

7. An interconnect system in accordance with claim 1 wherein at least one of said first conductive layer and second conductive layer is derived from a first paste applied in a pattern which, when sintered, results in at least one of said first conductive layer and said second conductive layer.

8. An interconnect system in accordance with claim 1 wherein at least one of said third conductive layer and said fourth conductive layer is derived from a second paste applied in a pattern, which, when sintered, results in at least one of said third conductive layer and said fourth conductive layer.

9. An interconnect system in accordance with claim 1 wherein said second metal interconnect is formed from an alumina-forming ferritic stainless steel alloy.

10. An interconnect system in accordance with claim 9 wherein said second metal interconnect is coated with a material selected from the group consisting of silver and silver alloy.

11. A fuel cell stack comprising an interconnect system for connecting adjacent of individual fuel cells having anodes and cathodes,
    wherein said interconnect system consists of:
    a separator plate disposed between an anode of a first fuel cell and a cathode of a second fuel cell to provide an anode gas flow space and a cathode air flow space and to provide electrical conductivity between said anode and said cathode,
    a first metal interconnect disposed between said separator plate and said anode, wherein said first metal interconnect is incompressible in a direction perpendicular to a surface of said cell,
    a first conductive layer bonded to said anode and to said first metal interconnect, a second conductive layer bonded to said first metal interconnect and said separator plate, a second metal interconnect disposed between said separator plate and said cathode, wherein said second metal interconnect is incompressible in a direction perpendicular to a surface of said cell, a third conductive layer bonded to said cathode and to said second metal interconnect, and a fourth conductive layer bonded to said second metal interconnect and said separator plate.

12. A fuel cell stack in accordance with claim 11 wherein a thin layer of silver or silver alloy is disposed between said third conductive layer and said cathode.

13. A fuel cell stack in accordance with claim 11 wherein a plurality of contact points are made between at least one of said first and second metal interconnects and said separator plate and between at least one of said first and second metal interconnects and said anode or said cathode.

14. A fuel cell stack in accordance with claim 13 wherein said plurality of contact points are spaced about 0.5 mm to about 5.0 mm apart.

15. A fuel cell stack in accordance with claim 13 wherein surface irregularities in the anode or cathode at the plurality of contact points are filled by one of said first, second, third or fourth conductive layers.

* * * * *